Figure 1:
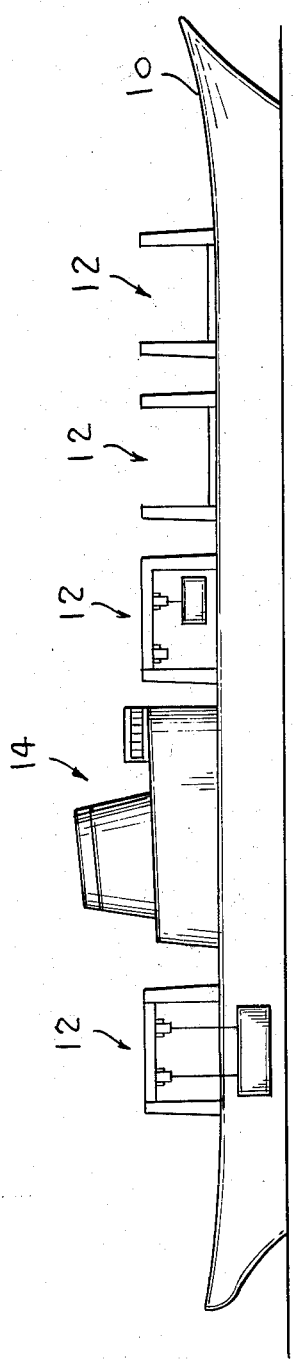

Oct. 30, 1962 — R. L. BEVARD — 3,061,112
MATERIAL HANDLING APPARATUS
Filed Dec. 8, 1960 — 5 Sheets-Sheet 1

INVENTOR.
ROGER L. BEVARD
BY John W. Michael
ATTORNEY

Oct. 30, 1962  R. L. BEVARD  3,061,112
MATERIAL HANDLING APPARATUS
Filed Dec. 8, 1960  5 Sheets-Sheet 4

INVENTOR.
ROGER L. BEVARD
BY
John W. Michael
ATTORNEY

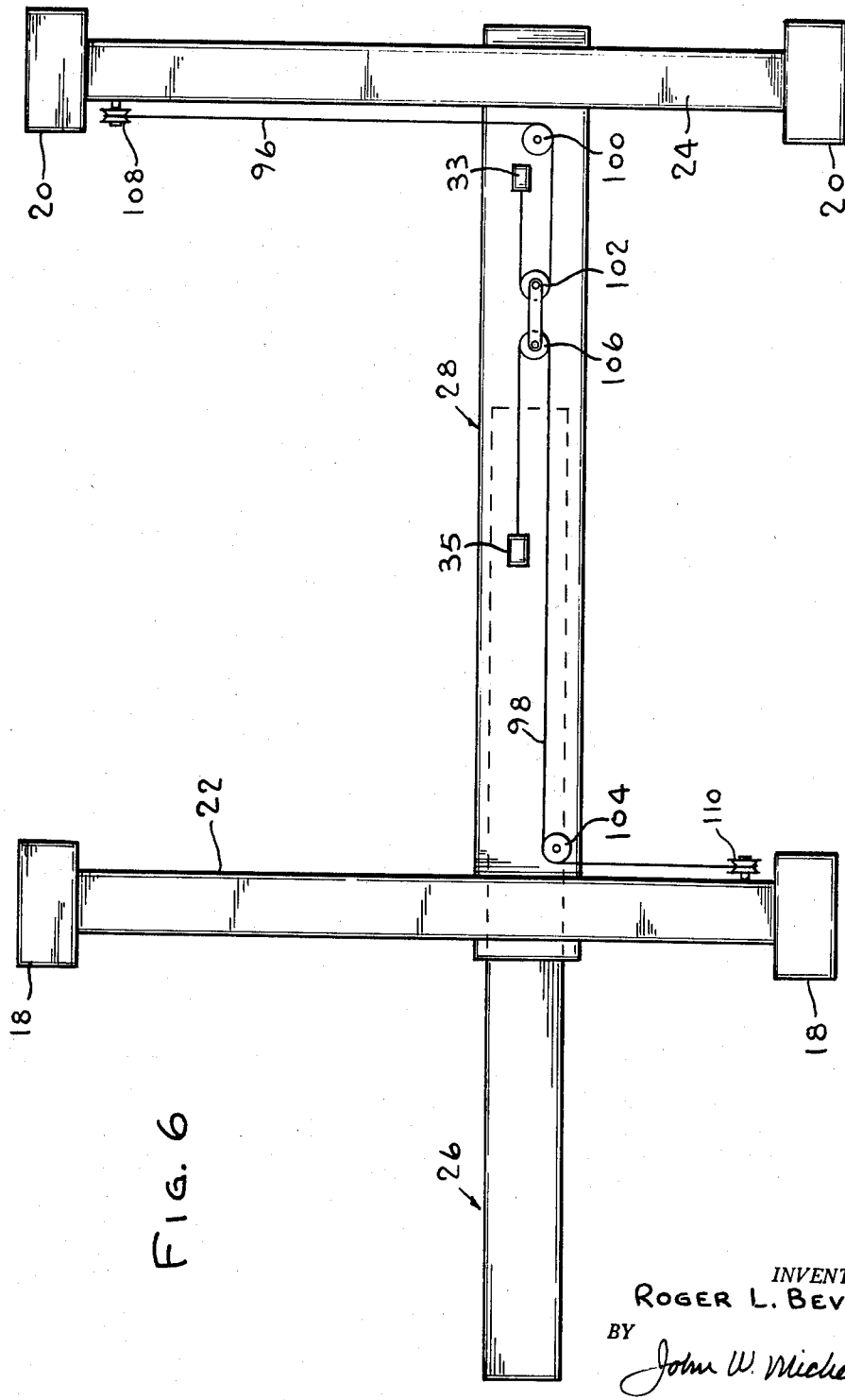

United States Patent Office 3,061,112
Patented Oct. 30, 1962

3,061,112
MATERIAL HANDLING APPARATUS
Roger L. Bevard, Iron Mountain, Mich., assignor to Lake Shore, Inc., Iron Mountain, Mich., a corporation of Michigan
Filed Dec. 8, 1960, Ser. No. 74,614
9 Claims. (Cl. 212—74)

This invention relates to material handling apparatus and particularly to cargo handling apparatus for ships which includes a plurality of separate units one for each hatch.

It is an object of this invention to provide overdeck gear of this type wherein each unit includes a pair of booms which can be operated together to handle loads of increased size and weight.

Another object is to provide overdeck gear which can be partially lowered for storage on deck when not in use to thereby decrease windage, increase visibility and lower the ship's center of gravity.

A further object is to provide overdeck gear of the above type which has the hoist motor for each unit mounted on the deck and has a hoist reeving arrangement wherein the load is not raised or lowered as a result of either fore and aft or athwartship movement of the booms.

A final object is to provide a power and control cable arrangement for the boom drive equipment mounted on the overdeck gear which remains of constant length during fore and aft and athwartship movement of the booms.

The objects of this invention are attained by overdeck gear having two pairs of vertical support columns and a horizontal cross support mounted between each pair of support columns and extending in a fore and aft direction. A pair of booms is supported by said cross supports and adapted for athwartship movement with respect to said cross supports. A boom trolley means is provided for the booms to provide fore and aft transverse movement of the booms on the cross supports. Each of the booms can be independently controlled and when handling loads which are particularly heavy and/or bulky, both booms can be used together to handle loads of up to twice the rated load of each individual boom.

The cross supports are movably mounted on the support columns for vertical movement up and down on the columns. A means for raising and lowering the cross supports on the columns is provided so that the gear can be lowered to the deck when not in use to thereby decrease windage, improve visibility and lower the ship's center of gravity.

The hoist reeving arrangement for the overdeck gear is designed so that the hoist motor can be mounted on deck to thus reduce the weight of the gear supported above the deck on the support columns. The hoist reeving arrangement is designed so that the boom can be either moved transversely fore and aft on the cross supports (by means of the boom trolley) or racked athwartship in the boom trolley without changing the position of the hook block with respect to the load trolley on the boom.

A further refinement of the overdeck gear relates to the control and power cable reeving arrangement for the boom and boom trolley drive motors wherein such cables will always remain of constant length during operation of the equipment.

Figure 2:
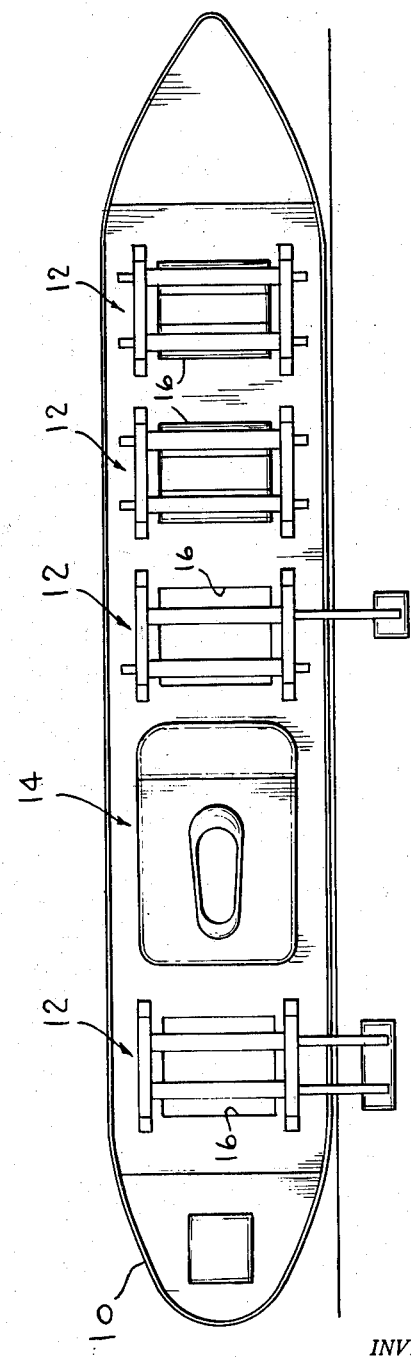
Figure 3:
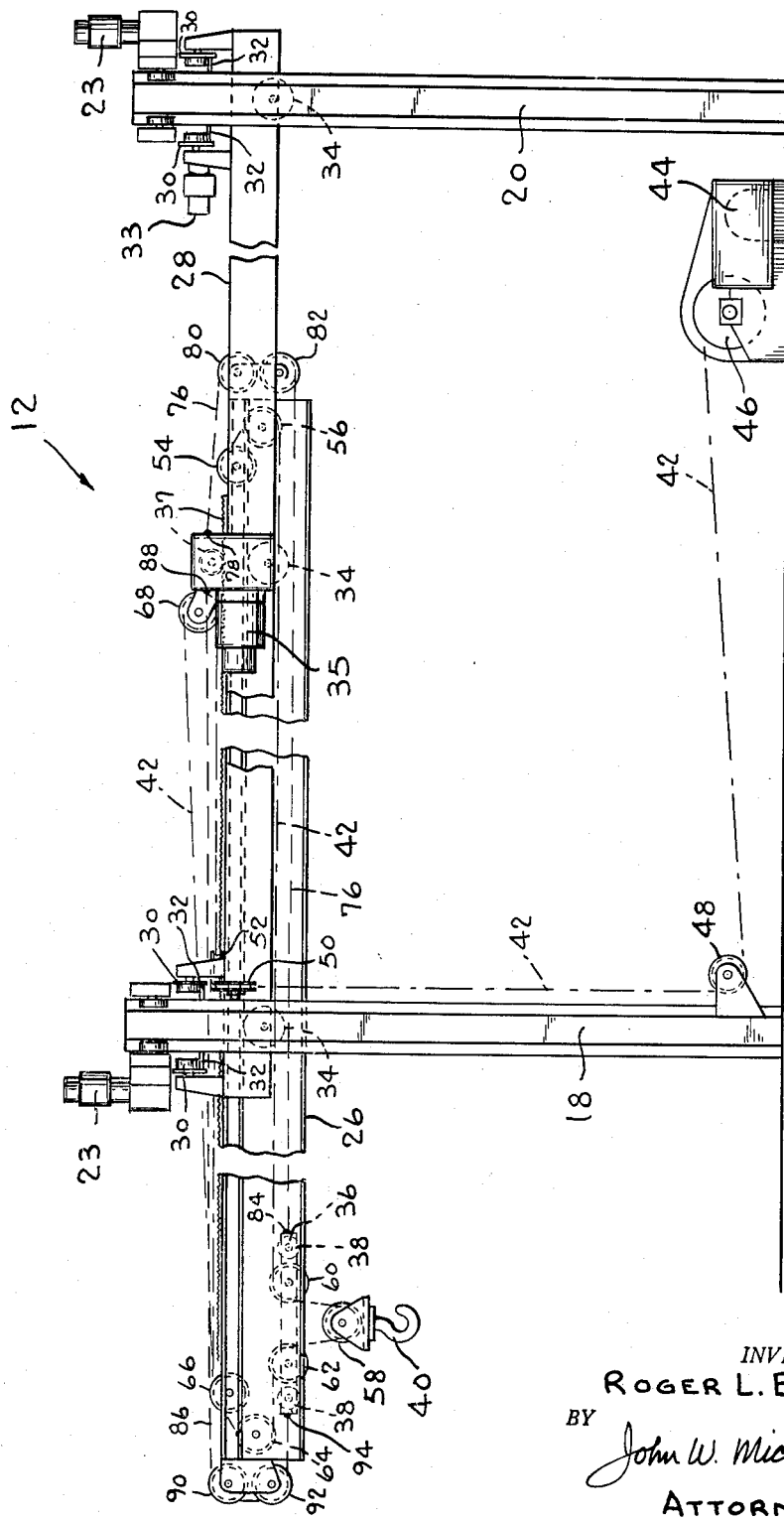
Figure 4:
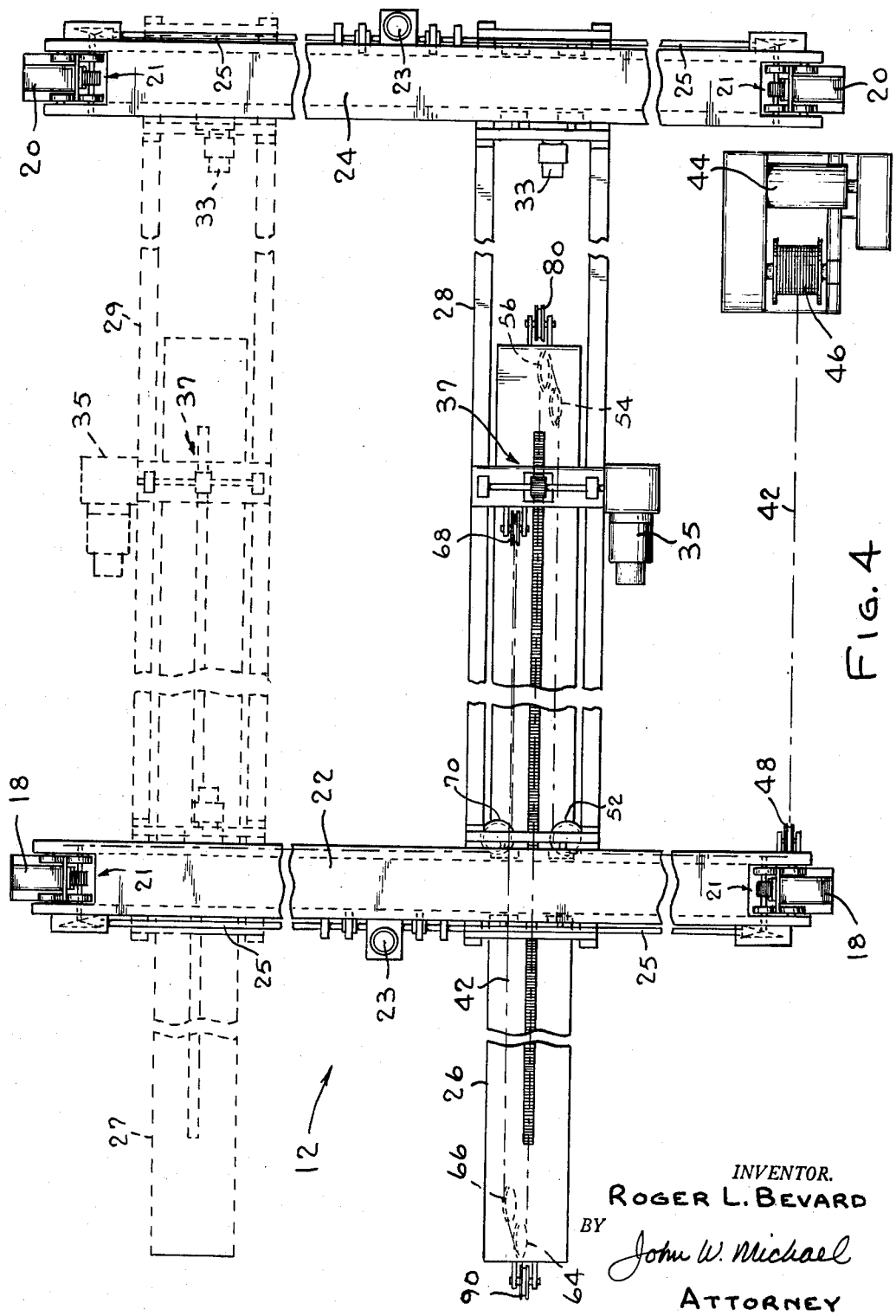
Figure 5:
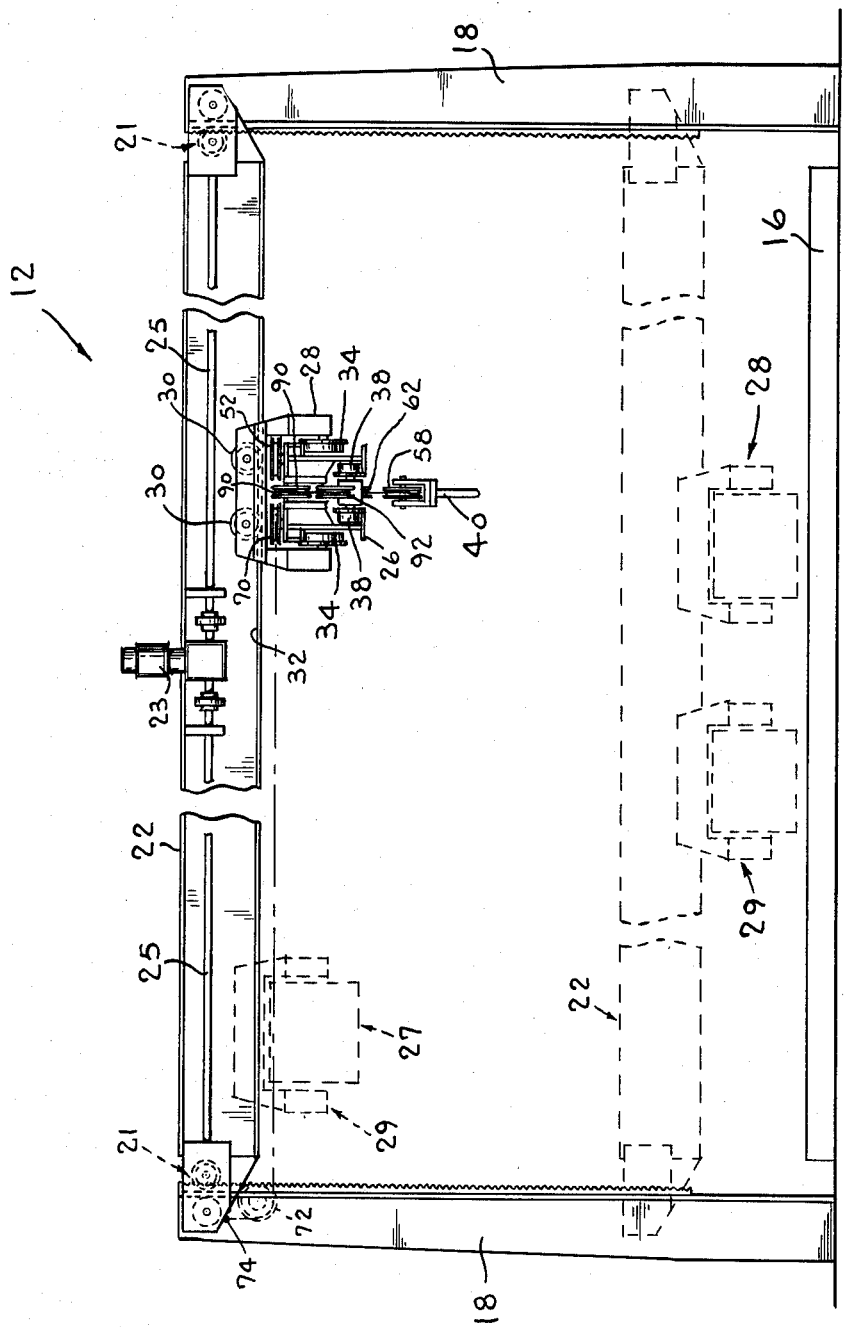

Other objects and advantages will be pointed out in, or be apparent from, the specification and claims, as will obvious modifications of the single embodiment shown in the drawings, in which:

FIGS. 1 and 2 are side elevation and top plan views, respectively, of a ship equipped with overdeck gear constructed in accordance with this invention;

FIG. 3 is an elevation view of a single cargo handling unit embodying the invention looking in a fore and aft direction from bow to stern;
FIG. 4 is a top plan view of the gear shown in FIG. 3;
FIG. 5 is a side elevation view of the gear shown in FIG. 3 looking in an athwartship direction; and
FIG. 6 is a partially schematic top plan view showing the reeving arrangement for the electrical cables to the drive motors mounted on the overdeck gear.

Referring to the drawings in detail, FIGS. 1 and 2 show an average size freighter 10 equipped with a total of four cargo handling units 12 located fore and aft of the ship's superstructure 14 as shown. Each unit is designed to load and unload cargo in and out of the ship's holds through separate hatches 16.

Each unit 12 includes pairs of support columns 18 and 20 spaced adjacent the four corners of a hatch 16 and having cross supports 22 and 24 mounted between the pairs of columns and extending in a fore and aft direction above the ship's deck. The support columns and cross supports together form a bridge-like structure on which a pair of extensible booms 26 and 27 are mounted on the underside of cross supports 22, 24 by means of a pair of boom trolleys 28 and 29.

The entire cross support, boom trolley, and boom assembly can be lowered to the deck to a position shown in dotted lines in FIG. 5 to thereby decrease windage, improve visibility and lower the ship's center of gravity. This is accomplished by movably attaching the ends of cross supports 22 and 24 to support columns 18 and 20 and providing a suitable means for raising and lowering the cross supports on the columns. One such means is that shown in the drawings wherein the cross supports are raised and lowered by rack and pinion gearing 21 mounted on the ends of the cross supports and the inner sides of the four columns. The pinion gears are driven by a pair of electric motors 23 having drive shafts 25 each mounted on a cross support as shown. Thus, it is seen that when the cargo handling gear is not in use, cross supports 22 and 24 can be lowered on columns 18, 20 for stowage on the ship's deck to the position shown in dotted lines in FIG. 5. It should be understood that means other than that shown and described could be utilized to raise and lower the cross supports. One alternative arrangement (not shown), would employ cables reeved from a hoist motor on the deck to the cross supports by means of sheaves mounted on the support columns. Such an arrangement would reduce the weight of the equipment carried by the cross supports.

Since the construction of each boom and boom trolley is substantially identical only one will be shown in detail on the drawings and described in detail herein. Trolley 28 is provided with pairs of rollers 30 mounted on the upper portions thereof and positioned to ride on oppositely extending flanges 32 on each of the cross supports 22 and 24 to permit transverse fore and aft movement of boom 26 over a hatch 16. The boom trolleys are driven fore and aft on the cross supports by drive motors 33 mounted on the trolleys. Either a single drive motor at one end of the trolley having a cross drive shaft to the other end or a pair of drive motors (one at each end) can be employed.

Trolley 28 is provided further with three or five spaced pairs of rollers 34 on which boom 26 is slidably mounted for longitudinal athwartship movement over the hatches and outboard of the ship on either side thereof. The booms are racked on the boom trolleys by means of drive motors 35 mounted on the central portions of the trolleys. The booms are driven by motors 35 by any suitable means such as rack and pinion gearing 37, as shown.

Boom 26 is equipped with a load trolley 36 mounted for athwartship movement along the boom by rollers 38. A hook block 40 is supported from trolley 36 by a hoist cable 42 which is reeved from a hoist motor 44 and drum 46 located on the deck. Hoist cable 42 is wound in hoist drum 46 driven by motor 44 and is reeved from the deck up to the right end of cross support 22 as viewed in FIG. 5 by means of sheaves 48 and 50 mounted at the base of column 18 and the right end of cross support 22, respectively. From sheave 50 at the right end of cross support 22, cable 42 is reeved over a sheave 52 on boom trolley 28 and then over a pair of sheaves 54, 56 at the right hand end of boom 26 as viewed in FIGS. 3 and 4. From the end of boom 26 the cable is reeved to a sheave 58 in hook block 40 over sheaves 60 and 62 mounted on load trolley 36. From the load trolley the cable is reeved over a pair of sheaves 64, 66 mounted on the left hand end of boom 26 and then back to a sheave 68 at the center of boom trolley 28. From sheave 68 the cable is reeved over a sheave 70 on boom trolley 28 and then to the left hand end of cross support 22 (as viewed in FIG. 5) where it is reeved over a sheave 72 on the cross support and then dead-ended at a point 74 on the cross support.

With the above described reeving arrangement it will be seen that when hoist motor 44 is energized to drive drum 46 in a counterclockwise direction (as viewed in FIG. 3), hook block 40 will be lowered from load trolley 36 and when the rotation of drum 46 is reversed the load block will be raised.

The disclosed reeving arrangement provides important advantages. First, it permits the mounting of the hoist motor 44 and drum 46 on the deck to thus reduce the weight of the overdeck gear itself and furthermore with the hoist motor on the deck, the control and power cable arrangement for such hoist motor is greatly simplified.

It should also be noted that by reeving the hoist cable 42 first to one end of cross support 22, then to the boom trolley 28, then between opposite ends to boom 26, then back to the boom trolley and then back to the other end of the cross support, the boom can be either moved transversely fore and aft on the cross supports (by means of the boom trolley) or racked athwartship in the boom trolley without changing the position of hook block 40 with respect to load trolley 36. By dead-ending hoist cable 42 at point 74 at the top of the left-hand column 18 (as viewed in FIG. 5) and reeving it to the boom and then to sheave 48 at the bottom of the right-hand column, raising and lowering of the overdeck gear is permitted without danger of breaking the hoist cable if for example the gear was raised without sufficient slack-out. Furthermore, it is noted at this point that by reeving hoist cable 42 over the additional sheave 68 on the middle of boom trolley 28, boom 26 can be racked outboard of the ship to the right (as viewed in FIGS. 3 and 4) to the same extent as it can be racked to the left of cross support 22 on which sheaves 52 and 70 are mounted.

Turning now to the haulage reeving arrangement for the overdeck gear, a first haulage cable 76 is dead-ended on boom trolley 28 at a point 78 from which it extends to the right hand end of boom 26 (as viewed in FIG. 3) where it is reeved over a pair of sheaves 80, 82 mounted on the end of the boom and then back to the left where it is dead-ended on load trolley 36 at a point 84. A second haulage cable 86 is dead-ended on boom trolley 28 at a point 88 from which it extends to a pair of sheaves 90, 92 mounted on the left hand end of the boom and then back to load trolley 36 where it is dead-ended at a point 94. With the above described haulage reeving arrangement racking of the boom will cause the load trolley to move with respect to the boom. For example, if boom 26 is racked to the right (as viewed in FIG. 3) by means of motor 35 and gearing 37, cable 76 will pull load trolley 36 to the right along the boom. Similarly, if boom 26 is racked in the opposite direction, cable 86 will pull trolley 36 to the left along the boom.

Another feature of this invention is the control and power cable arrangement for drive motors 33 and 35 mounted on boom trolley 28 wherein such cables remain of constant length during operation of the gear to thus eliminate the necessity of suitable take-up devices for the cables. The arrangement is shown schematically in FIG. 6, and includes a pair of constant length cables 96, 98 for motors 33 and 35, respectively. Cable 96 is reeved from the deck up to a sheave 108 at the end of cross support 24 by any suitable arrangement (not shown) and then to motor 33 by means of a sheave 100 mounted on the right hand end of trolley 28 and one sheave 102 of a pair of interconnected sheaves movably mounted on the trolley as shown. Cable 98 is reeved from the deck up to a sheave 110 at the end of cross support 22 by any suitable means (not shown) and then to motor 35 by means of a sheave 104 mounted on the left hand end of trolley 28 and the other sheave 106 of the pair of interconnected sheaves movably mounted on the trolley. With the above arrangement, fore and aft movement of trolley 28 on the cross supports will cause cables 96 and 98 to be alternately pulled in and pulled out together depending on the direction of travel with the cables at all times remaining of constant length.

*Operation*

Based on the foregoing description of the overdeck gear of this invention, its operation is as follows. Assume it is desired to load an object from the dock into the hold of the ship. First the gear must be raised to operating position on the columns by energizing motors 23 which will raise the cross supports on the columns by means of drive shafts 25 and rack and pinion gearing 21. Next, the hook block 40 is properly positioned over the load by fore and aft manipulation of trolley 28 (driven by motor 33) and athwartship racking of boom 26 (driven by motor 35). The hook block is then lowered to the load by hoist motor 44 and raised from the dock by reversing the hoist motor. The load is then moved horizontally to the desired point over the ship's hold by proper manipulation of the boom and boom trolley and is then lowered into the hold for stowage aboard ship. When handling loads which are particularly heavy and/or bulky such as a freight car or truck body, for example, both booms 26 and 27 can be used together to handle loads of up to twice the rated load of each individual boom and with better control over the load than with a single hook.

Although but a single embodiment of the present invention has been illustrated and described, it will be apparent to those skilled in the art that various changes and modifications may be made therein without departing from the spirit of the invention or from the scope of the appended claims.

I claim:

1. Cargo handling apparatus for a ship comprising, boom support means including a plurality of support columns and a pair of spaced cross supports mounted on said columns and extending in a fore and aft direction, a pair of booms supported by said cross supports and adapted for athwartship movement with respect to said cross supports, and boom trolley means for said booms to provide fore and aft transverse movement of said booms on said cross supports.

2. Cargo handling apparatus for a ship comprising, two pairs of vertical support columns, a horizontal cross support movably mounted between each pair of said support columns, said horizontal cross supports extending in a fore and aft direction and adapted for vertical movement with respect to said support columns, a boom supported by said cross supports and adapted for athwartship movement with respect to said cross supports, boom trolley means for said boom to provide fore and aft transverse movement of said boom on said cross supports, and means for raising and lowering said cross supports on said support columns.

3. Cargo handling apparatus for a ship comprising, boom support means including a plurality of support columns and a pair of spaced cross supports mounted on said columns and extending in a fore and aft direction, a pair of booms supported by said cross supports and adapted for athwartship movement with respect to said cross supports, boom trolley means for said booms to provide fore and aft transverse movement of said booms on said cross supports, and a load trolley mounted on each of said booms and adapted for athwartship movement along said booms.

4. Cargo handling apparatus for a ship comprising, boom support means including a plurality of support columns mounted on the deck and a pair of spaced cross supports mounted on said columns and extending in a fore and aft direction, a boom supported by said cross supports and adapted for athwartship movement with respect to said cross supports, a boom trolley for said boom to provide fore and aft transverse movement of said boom on said cross supports, a load trolley mounted on said boom and adapted for athwartship movement along said boom, and hoist means for raising and lowering a load to and from said load trolley, said hoist means including a hoist motor mounted on the deck.

5. Cargo handling apparatus for a ship comprising, boom support means including a plurality of support columns and a pair of spaced cross supports mounted on said columns and extending in a fore and aft direction, a boom supported by said cross supports and adapted for athwartship movement with respect to said cross supports, boom trolley means for said boom to provide fore and aft transverse movement of said boom on said cross supports, a load trolley mounted on said boom and adapted for athwartship movement along said boom, a boom drive means for racking said boom athwartship on said boom trolley means, and a pair of haulage cables dead-ended on said boom trolley means, then reeved to opposite ends of said boom, and then to said load trolley where said cables are dead-ended.

6. Cargo handling apparatus for a ship comprising, boom support means including a plurality of support columns and a pair of spaced cross supports mounted on said columns and extending in a fore and aft direction, a boom supported by said cross supports and adapted for athwartship movement with respect to said cross supports, a boom trolley for said boom adapted to provide fore and aft transverse movement of said boom on said cross supports, a boom drive motor mounted on said boom trolley and adapted to rack said boom athwartship on said boom trolley, a boom trolley drive motor mounted on said boom trolley and adapted to drive said boom trolley fore and aft on said cross supports, and a constant length control cable arrangement for said drive motors including a pair of control cables one for each of said drive motors, and a pair of interconnected sheaves movably mounted on said boom trolleys and having one of said control cables reeved over each of said interconnected sheaves.

7. Cargo handling apparatus for a ship comprising, boom support means including a plurality of support columns and a pair of spaced cross supports mounted on said columns and extending in a fore and aft direction, a boom supported by said cross supports and adapted for athwartship movement with respect to said cross supports, a boom trolley for said boom adapted to provide fore and aft transverse movement of said boom on said cross supports, a boom drive motor mounted on said boom trolley and adapted to rack said boom athwartship on said boom trolley, a boom trolley drive motor mounted on said boom trolley and adapted to drive said boom trolley fore and aft on said cross supports, and a constant length control cable arrangement for said drive motors including a pair of interconnected sheaves movably mounted on said boom trolley, a first cable reeved to the end of a cross support, then to one end of said boom trolley, then around one sheave of said pair of interconnected sheaves and then to one of said drive motors, and a second cable reeved to the end of a cross support, then to the other end of said boom trolley, then around the other sheave of said pair of interconnected sheaves and then to the other of said drive motors.

8. Cargo handling apparatus for a ship comprising, boom support means including a plurality of support columns mounted on deck and a pair of spaced cross supports mounted on said columns and extending in a fore and aft direction, a boom supported by said cross supports and adapted to athwartship movement with respect to said cross support, a boom trolley for said boom to provide fore and aft transverse movement of said boom on said cross supports, a load trolley mounted on said boom and adapted for athwartship movement along said boom, a boom drive means for racking said boom athwartship on said boom trolley, hoist means for raising and lowering a load to and from said load trolley, said hoist means including a hoist motor mounted on the deck, and a hoist cable reeved from said motor to one end of one of said cross supports, then to one end of said boom trolley adjacent said one cross support, then between the ends of said boom, then to the center of said boom trolley, then back to said one end of said boom trolley, then to the other end of said one cross support, and then to the top of a support column at the other end of said one cross support where said hoist cable is dead-ended, and a pair of haulage cables dead-ended on said boom trolley, then reeved to opposite ends of said boom, and then to said load trolley where said haulage cables are dead-ended.

9. Cargo handling apparatus for a ship comprising, boom support means including a plurality of support columns mounted on the deck and a pair of spaced cross supports mounted on said columns and extending in a fore and aft direction, a boom supported by said cross supports and adapted for athwartship movement with respect to said cross supports, a boom trolley for said boom to provide fore and aft transverse movement of said boom on said cross supports, a load trolley mounted on said boom and adapted for athwartship movement along said boom, and hoist means for raising and lowering a load to and from said load trolley, said hoist means including a hoist motor mounted on the deck and a hoist cable reeved from said motor to one end of one cross support, then to one end of said boom trolley adjacent said one cross support, then between the ends of said boom, then to the center of said boom trolley, then back to said one end of said boom trolley, then to the other end of said one cross support, and then to the top of a support column at the other end of said one cross support where said cable is dead-ended.

References Cited in the file of this patent

UNITED STATES PATENTS

| | | |
|---|---|---|
| 2,555,297 | Smith et al. | May 29, 1951 |
| 2,660,319 | Dorland | Nov. 24, 1953 |
| 2,704,037 | Babcock et al. | Mar. 15, 1955 |
| 2,793,766 | Fetchko | May 28, 1957 |
| 2,887,235 | Ladner | May 19, 1959 |
| 2,906,413 | Minty | Sept. 29, 1959 |